United States Patent
Jouhikainen et al.

(10) Patent No.: US 10,963,938 B2
(45) Date of Patent: *Mar. 30, 2021

(54) SYSTEMS AND METHODS FOR PROVIDING AN INTERACTIVE VIRTUAL ENVIRONMENT

(71) Applicant: Capital One Services, LLC, McLean, VA (US)

(72) Inventors: Hannes Jouhikainen, Arlington, VA (US); Karen Nickerson, Chicago, IL (US); Justin Wishne, Chicago, IL (US); Drew Jacobs, Arlington, VA (US); Justin Smith, Chicago, IL (US); Marco S. Giampaolo, Berwyn, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/576,991

(22) Filed: Sep. 20, 2019

(65) Prior Publication Data

US 2020/0013101 A1 Jan. 9, 2020

Related U.S. Application Data

(63) Continuation of application No. 16/170,114, filed on Oct. 25, 2018, now Pat. No. 10,475,097, which is a (Continued)

(51) Int. Cl.
*G06Q 30/00* (2012.01)
*G06Q 30/06* (2012.01)
(Continued)

(52) U.S. Cl.
CPC ......... *G06Q 30/0623* (2013.01); *G06F 16/29* (2019.01); *G06F 16/9537* (2019.01);
(Continued)

(58) Field of Classification Search
CPC .. G06F 16/29; G06F 16/9537; G06F 3/04842; G06F 3/1454; G06Q 30/0641;
(Continued)

(56) References Cited

U.S. PATENT DOCUMENTS

2011/0214082 A1 9/2011 Osterhout et al.
2012/0249586 A1 10/2012 Wither et al.
(Continued)

OTHER PUBLICATIONS

Fritz, et al. "Enhancing Cultural Tourism Experiences with Augmented Reality Technologies," The 6th International Symposium on Virtual Reality, Archaeology and Cultural Heritage, 2005, 6 pgs.

*Primary Examiner* — Robert M Pond
(74) *Attorney, Agent, or Firm* — Troutman Pepper Hamilton Sanders LLP; Christopher J. Forstner

(57) ABSTRACT

A system includes one or more memory devices storing instructions, and one or more processors configured to execute the instructions to perform steps of a method for providing an interactive virtual environment. The system may receive environmental data, and generate virtual environmental data based on the environmental data. The system may then provide the virtual environmental data to at least a first computing device to create a virtual environment. The system may then receive user input, and modify the virtual environment to display enhanced content in response to the user input.

20 Claims, 6 Drawing Sheets

Related U.S. Application Data continuation of application No. 15/664,920, filed on Jul. 31, 2017, now Pat. No. 10,152,738.

(60) Provisional application No. 62/437,706, filed on Dec. 22, 2016.

(51) Int. Cl.
| | |
|---|---|
| *G06Q 10/08* | (2012.01) |
| *G06F 16/29* | (2019.01) |
| *G06F 16/9537* | (2019.01) |
| *G06F 3/0484* | (2013.01) |
| *G06T 11/00* | (2006.01) |
| *G06F 3/14* | (2006.01) |

(52) U.S. Cl.
CPC ....... *G06Q 10/087* (2013.01); *G06Q 30/0641* (2013.01); *G06F 3/04842* (2013.01); *G06F 3/1454* (2013.01); *G06T 11/00* (2013.01)

(58) Field of Classification Search
CPC ... G06Q 30/0623; G06Q 10/087; G06T 11/00
USPC .................................................. 705/26, 27
See application file for complete search history.

(56) References Cited

U.S. PATENT DOCUMENTS

| | | |
|---|---|---|
| 2013/0030903 A1 | 1/2013 | Spivack |
| 2013/0297460 A1 | 11/2013 | Spivack |
| 2015/0025662 A1 | 1/2015 | Di Censo et al. |
| 2015/0127486 A1 | 5/2015 | Advani |
| 2015/0279106 A1 | 10/2015 | Blanchflower et al. |
| 2015/0317667 A1 | 11/2015 | Wohlert et al. |
| 2016/0133230 A1 | 5/2016 | Daniels et al. |

SYSTEMS AND METHODS FOR PROVIDING AN INTERACTIVE VIRTUAL ENVIRONMENT

CROSS-REFERENCE TO RELATED APPLICATION

This application is a continuation of, and claims priority under 35 U.S.C. § 120 to, U.S. patent application Ser. No. 16/170,114, filed Oct. 25, 2018, which is a continuation of U.S. patent application Ser. No. 15/664,920, now U.S. Pat. No. 10,152,738, filed Jul. 31, 2017, which claims the benefit of U.S. Provisional Patent Application No. 62/437,706, filed Dec. 22, 2016, the entire contents of which are fully incorporated herein by reference.

FIELD OF INVENTION

The present disclosure relates to systems and methods for providing an interactive virtual environment, and more particularly providing an interactive virtual environment associated with a physical environment.

BACKGROUND

When making travel plans, a traveler may often be faced with difficult decisions regarding where to go, which sites to see, and which activities to engage in, particularly if the traveler is going somewhere new. For example, if a traveler is planning a vacation to a distant destination (or to one of several distant destinations), the traveler may want to maximize their experience during their limited time at whichever destination they choose without the benefit of knowing which tourist sites or activities are available and would be most enjoyable. Because vacations are often expensive and limited in time, decisions made in advance about where to go, what to see, and what to do can be crucial to a traveler's ultimate enjoyment of the trip. Travel guides and websites may provide some information about various tourist sites, attractions, and experiences, but can be inefficiently time-consuming and confusing for the traveler to review, are quickly outdated as availability, cost, and other details about tourist sites and activities change, and are typically not personalized to the traveler.

Accordingly, there is a need for improved systems and methods to help travelers more efficiently and effectively create their personalized travel plans. Embodiments of the present disclosure are directed to this and other considerations.

SUMMARY

Disclosed embodiments provide systems and methods for providing an interactive virtual environment.

Consistent with the disclosed embodiments, the system may include one or more memory devices storing instructions, and one or more processors configured to execute the instructions to perform steps of a method to provide an interactive virtual environment. The system may execute the instructions to receive environmental data comprising audio and visual information representing a physical environment. The system may then generate virtual environmental data based on the environmental data. The virtual environmental data may include data associated with a merchant having a presence in the physical environment. The system may then provide the virtual environmental data to at least a first computing device to create a virtual environment. The system may receive user input data associated with one or more predefined user inputs from the first computing device. In response to the user input data, the system may modify the virtual environment on the first computing device to display enhanced content, where the enhanced content may be content that is unrepresented in the physical environment.

Consistent with the disclosed embodiments, methods for providing an interactive virtual environment are also disclosed.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
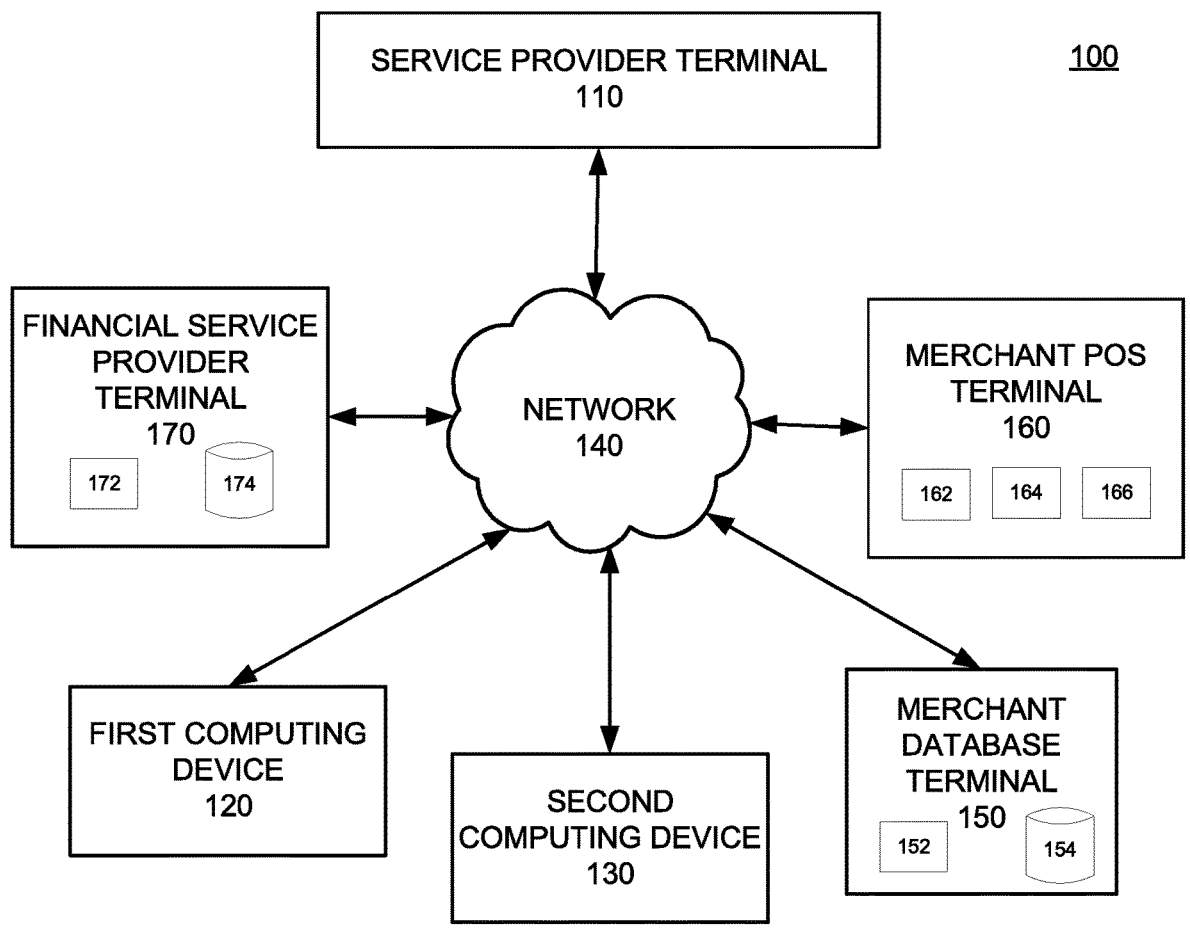
FIG. 1 is a diagram of an exemplary system that may be used to provide an interactive virtual environment.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for providing an interactive virtual environment that may be used as an aid in travel planning. The system may include one or more memory devices storing instructions, and one or more processors configured to execute the instructions to perform steps of a method. Specifically, in some embodiments, the system may provide an interactive virtual environment. To accomplish this, the system may execute the instructions to receive environmental data comprising audio and visual information representing a physical environment. The system may then generate virtual environmental data based on the environmental data. The virtual environmental data may include data associated with a merchant having a presence in the physical environment. The system may then provide the virtual environmental data to at least a first computing device to create a virtual environment. The system may receive user input data associated with one or more predefined user inputs from the first computing device. In response to the user input data, the system may modify the virtual environment on the first computing device to display enhanced content, where the enhanced content may be content that is unrepresented in the physical environment.

In another embodiment, a system for providing an interactive virtual environment that may be used as an aid in travel planning may include an environmental data sensor for obtaining environmental data comprising audio and/or visual information representing a physical environment. The system may include a geographic location sensor associated with the environmental data sensor for obtaining location data associated with the physical environmental and an input/output device for receiving merchant data from a merchant database. The merchant database may include data associated with merchants located at a specific geographic location. The system may further include a virtual environment processor that, based on the location data obtained by the geographic location sensor, determines merchant data stored in the merchant database that is relevant to the geographic position of the environmental data sensor, integrates the merchant data with the environmental data to create augmented environmental data, and generates a signal comprising augmented environmental data. The system may also include an augmented environmental data display that receives the signal comprising augmented environmental data and displays said augmented environmental data in accordance with said signal.

In another aspect, a non-transitory computer-readable medium storing instructions is disclosed. The instructions, when executed by one or more processors, may cause a computing device to perform steps of a method for providing an interactive virtual environment. Specifically, the computing device may receive environmental data comprising audio and visual information representing a physical environment. The computing device may then generate virtual environmental data based on the environmental data. The virtual environmental data may include data associated with a merchant having a presence in the physical environment. The instructions may then cause the computing device to provide the virtual environmental data to at least a first computing device to create a virtual environment. The computing device may receive user input data associated with one or more predefined user inputs from the first computing device. In response to the user input data, the computing device may modify the virtual environment on the first computing device to display enhanced content, where the enhanced content may be content that is unrepresented in the physical environment.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary system that may be configured to perform one or more processes that can provide an interactive virtual environment. The components and arrangements shown in FIG. 1 are not intended to limit the disclosed embodiments as the components used to implement the disclosed processes and features may vary.

In accordance with disclosed embodiments, an interactive virtual environment system 100 may include a service provider terminal 110 in communication with a first computing device 120 and a second computing device 130 via network 140. First and second computing devices 120 and 130 may include a mobile computing device (e.g., a smart phone, tablet computer, smart wearable device, portable laptop computer, voice command device, or other mobile computing device) or a stationary computing device (e.g., a stationary desktop or other stationary computer). Computing devices 120 and 130 may belong to or be provided by a consumer, or may be borrowed, rented, or shared. In some embodiments, computing devices 120 and 130 may be configured to provide one or more of an augmented reality and a virtual reality experience to one or more users, and may be equipped with a display, speakers or other auditory devices, tactile simulators, and other devices configured to engage the user's senses to enhance the augmented/virtual reality experience.

In some embodiments, interactive virtual environment system 100 may also include a merchant database terminal 150 that communicates with other devices of system 100 via network 140. Optionally, in some embodiments, interactive virtual environment system 100 may also include a merchant point of sale (POS) terminal 160 that communicates with other devices of system 100 via network 140. Additionally, in some embodiments, interactive virtual environment system 100 may also include a financial service provider terminal 170 that communicates with other devices of system 100 via network 140.

Network 140 may be of any suitable type, including individual connections via the internet such as cellular or WiFi networks. In some embodiments, network 140 may connect terminals using direct connections such as radio-frequency identification (RFID), near-field communication (NFC), Bluetooth™, low-energy Bluetooth™ (BLE), WiFi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
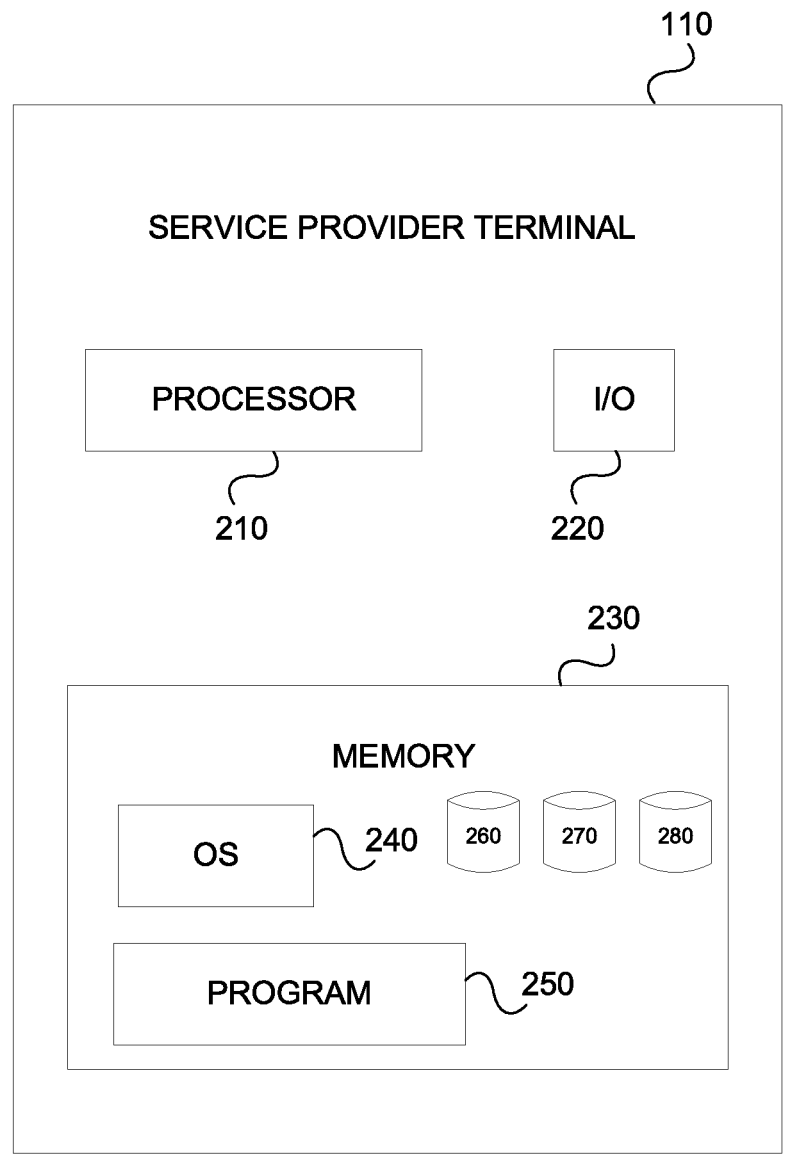
FIG. 2 is a component diagram of an exemplary service provider terminal.

An exemplary embodiment of service provider terminal 110 is shown in more detail in FIG. 2. Computing devices 120 and 130, merchant database terminal 150, merchant POS terminal 160, and financial service provider terminal 170 may have a similar structure and components that are similar to those described with respect to service provider terminal 110. As shown, service provider terminal 110 may include a processor 210, an input/output ("I/O") device 220, a memory 230 containing an operating system ("OS") 240 and a program 250. For example, service provider terminal 110 may be a single server or may be configured as a distributed computer system including multiple servers or computers that interoperate to perform one or more of the processes and functionalities associated with the disclosed embodiments. In some embodiments, the service provider terminal 110 may further include a peripheral interface, a transceiver, a mobile network interface in communication with the processor 210, a bus configured to facilitate communication between the various components of the service provider terminal 110, and a power source configured to power one or more components of the service provider terminal 110.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, Zig-Bee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Service provider terminal 110 may include one or more storage devices configured to store information used by processor 210 (or other components) to perform certain functions related to the disclosed embodiments. In one example, service provider terminal 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, service provider terminal 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, service provider terminal 110 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include a merchant information database 260, an environment database 270, and a virtual environmental database 280 for storing related data to enable service provider terminal 110 to perform one or more of the processes and functionalities associated with the disclosed embodiments. Merchant information database 260 may include stored data relating to product price (e.g., price of a hotel room, excursion, tour, massage, etc.), product inventory (e.g., availability of oceanfront hotel rooms, available time slots for an excursion, etc.), related products, and available discounts associated with one or more products associated with one or more merchants. Although this disclosure refers to "products" throughout, it should be understood that the term product or products may refer to goods, services, items, excursions, tours, or other activities or experiences that are offered for sale at the physical location or destination.

Additionally, the terms "product," "service," and "excursion" may be used interchangeably throughout the disclosure. Environment database 270 may include stored data relating to a physical environment that is captured by one or more devices (e.g., merchant POS terminal 160 or computing devices 120 and 130) of system 100. Virtual environment database 280 may include stored data relating to a virtual environment that is provided to and can be updated based upon interactions with one or more devices (e.g., computing devices 120 and 130) of system 100.

Service provider terminal 110 may also be communicatively connected to one or more memory devices (e.g., databases (not shown)) locally or through a network. The remote memory devices may be configured to store information and may be accessed and/or managed by service provider terminal 110. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Service provider terminal 110 may also include one or more I/O devices 220 that may comprise one or more interfaces for receiving signals or input from devices and providing signals or output to one or more devices that allow data to be received and/or transmitted by service provider terminal 110. For example, service provider terminal 110 may include interface components, which may provide interfaces to one or more input devices, such as one or more keyboards, mouse devices, touch screens, track pads, trackballs, scroll wheels, digital cameras, microphones, sensors, and the like, that enable service provider terminal 110 to receive data from one or more users (such as, for example, via computing devices 120 and 130).

In exemplary embodiments of the disclosed technology, service provider terminal 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While service provider terminal 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the terminal 110 may include a greater or lesser number of components than those illustrated.

Merchant database terminal 150 may have one or more processors 152 and one or more merchant databases 154, which may be any suitable repository of merchant data. Merchant database terminal 150 may be located at the POS location, off-site at another merchant location, or at a third party location. Information stored in merchant database terminal 150 may be accessed (e.g., retrieved, updated, and added to) via network 140 by one or more devices (e.g., service provider terminal 110) of system 100. Merchant database 154 may store information relating to products and services offered by merchants such as pricing, quantity, availability, discounts, reviews, and any other such generally available information that a consumer may utilize in making a purchasing decision. In some embodiments, merchant database 154 may also include location information associated with products and services that identifies the location(s) that a particular product or service is available for purchase. In some embodiments, the location information may include an identification of a particular store, terminal, or kiosk that the product or service may be purchased from.

Merchant POS terminal 160 may have one or more POS devices 162, 164, 166 that communicate with one or more devices (e.g., computing devices 120 and 130) of system 100 via network 140. In some embodiments, POS devices 162, 164, 166 may be associated with one or more products or items at a POS location, and may serve as beacons to identify the associated products or items and related information to one or more devices of system 100.

Financial service provider terminal 170 may have one or more processors 172 and one or more financial service provider databases 174, which may be any suitable repository of merchant data. Financial service provider terminal 170 may be located at the POS location, off-site at another financial service provider location, or at a third party location. Information stored in financial service provider database 174 may be requested and sent to one or more devices (e.g., service provider terminal 110, merchant POS terminal 160) of system 100 via network 140.

Figure 6:
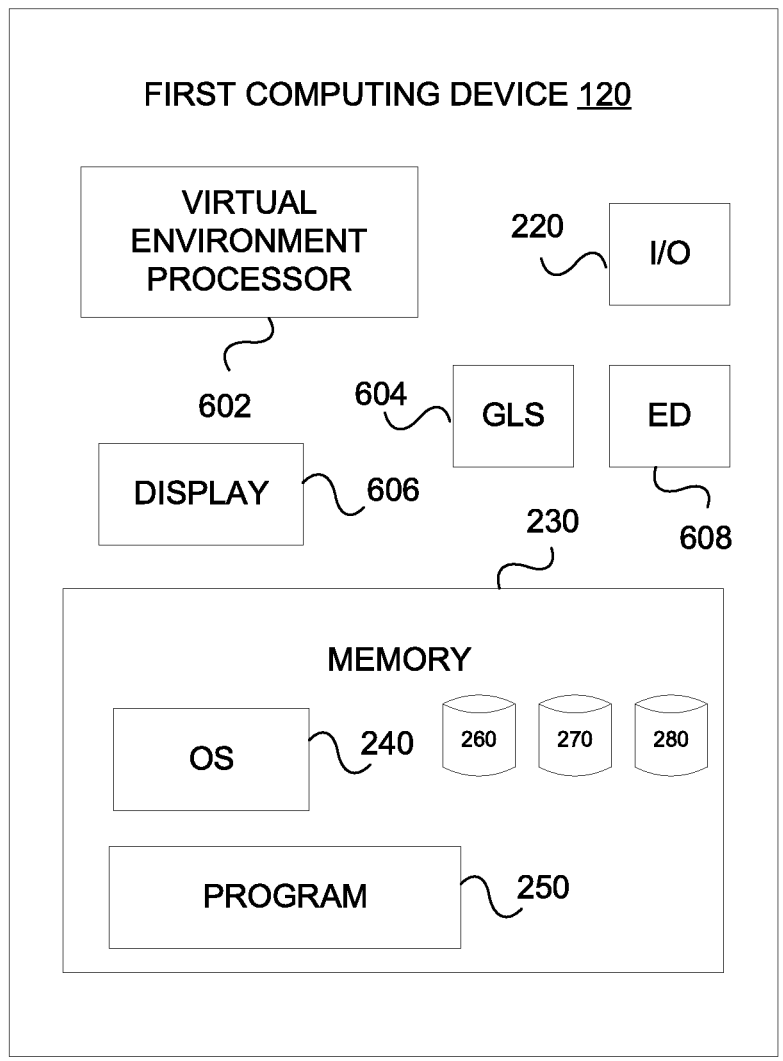
FIG. 6 is a component diagram of an exemplary computing device.

FIG. 6 shows an exemplary embodiment of first computing device 120. As shown, first computing device 120 may include input/output ("I/O") device 220, memory 230 containing operating system ("OS") 240 and program 250 and all associated components as described above with respect to service provider terminal 110. First computing device 120 may also have one or more processors, including a virtual environment processor 602 for generating signals representative of augmented and/or virtual environments, a geographic location sensor ("GLS") 604 for determining the geographic location of first computing device 120 and/or an associated environmental data sensor 608, an augmented environmental display 606 for displaying augmented environmental data, and an environmental data ("ED") sensor 608 for obtaining environmental data including audio and/or visual information representing a physical environment. In some embodiments, environmental data sensor 608 may include a microphone or a digital camera. According to some embodiments, virtual environment processor 602 may include all of the features and functions of processor 210 described above. Further, virtual environment processor 602 may be configured to determine merchant data stored in a merchant database that is relevant to the geographic position of the environmental data sensor based on location data obtained by the geographic location sensor 604. For example, upon determining the location of the environmental data sensor 608, virtual environment processor 602 may determine and obtain merchant data from the merchant database 154 that is associated with products and services that are within a predetermined distance from the environmental data sensor 608. Virtual environment processor 602 may integrate the merchant data with the environmental data to create an augmented environmental data, which may be used by the virtual environment processor 602 to generate a signal comprising augmented environmental data (an "augmented environment data signal") or a virtual environmental data signal. In some embodiments, an augmented environment data signal may be used to create an augmented reality display of the physical environment and a virtual environment data signal may be used to create a virtual reality display of the physical environment. The merchant data associated with the physical environment may be incorporated into either of the augmented reality display or the virtual reality display. According to some embodiments, the virtual environment processor 602 may transmit a virtual environmental data signal to a computing device that may generate a virtual environment display based on the virtual environmental data signal. Although FIG. 6 is described with respect to a first computing device 120, it is contemplated that in some embodiments, second computing device 130 may include some or all of the elements disclosed with respect to FIG. 6.

Figure 3:
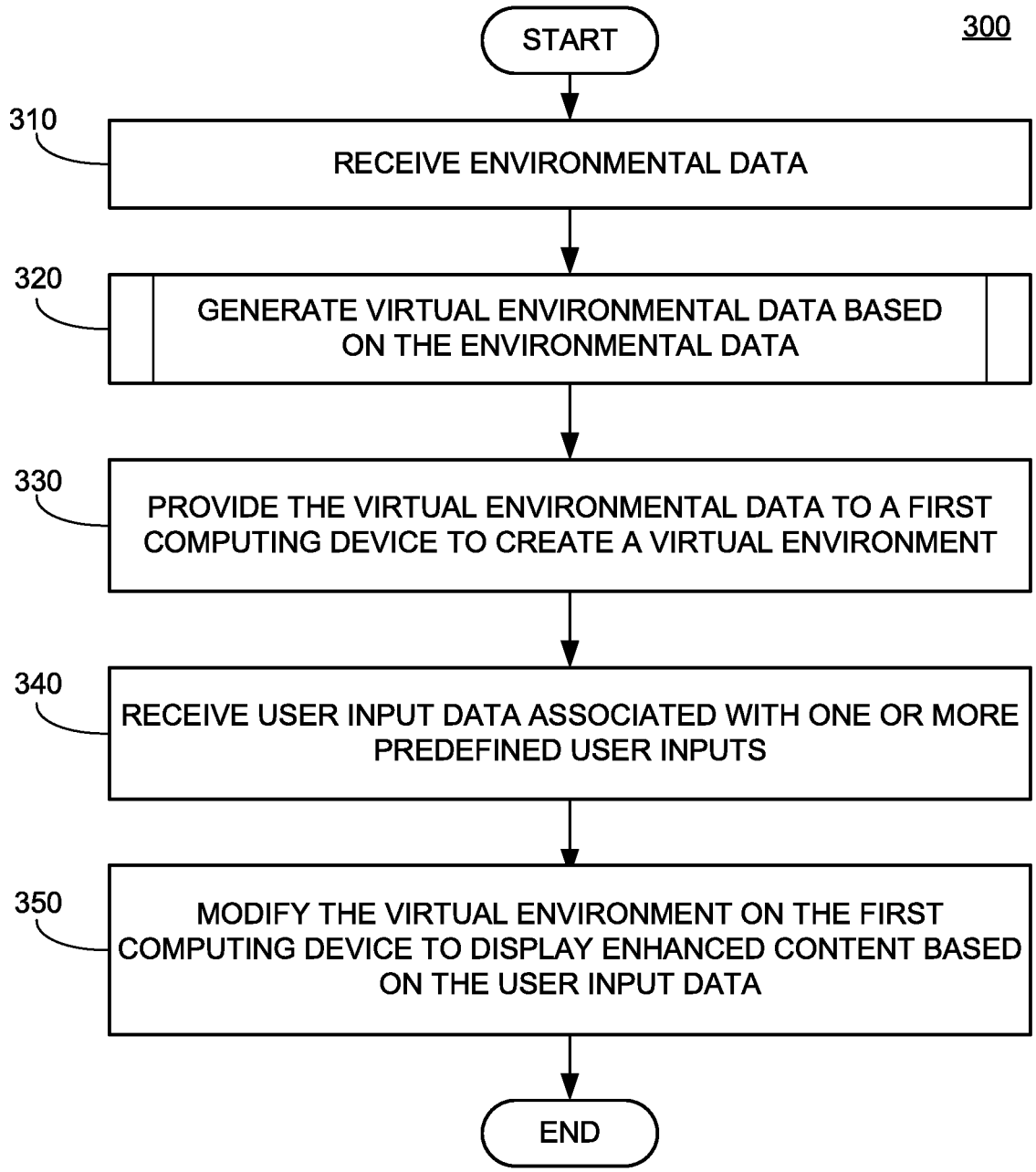
FIG. 3 is a flowchart of an exemplary method for providing an interactive virtual environment.

FIG. 3 shows a flowchart of method 300 for providing an interactive virtual environment. Method 300 may be performed by service provider terminal 110 using processor 210 to execute memory 230. In some embodiments, steps of method 300 may be delegated to other elements in system 100, such as the computing devices 120 and 130 and/or merchant database 150. Following method 300, one or more users may generate, share, and modify virtually augmented environments.

In block 310, service provider terminal 110 may receive environmental data comprising audio and visual information. In some embodiments, the environmental data may be associated with a physical environment, such as the physical environment at a travel destination (e.g., an oceanfront hotel room, an ancient ruins tour, a zipline excursion, a massage at the hotel spa, etc.).

After receiving the environmental data, at step 320, service provider terminal 110 may generate virtual environmental data based on the environmental data. The virtual environmental data may provide a virtual representation of the physical environment associated with the environmental data. The virtual environmental data may include one or more of product price information, product inventory information, related products, available discounts, and aesthetic visual effects. Product price information may include, for example, the price of a product, the price of an excursion or tour, the price of an activity, such as a massage or an amusement park ride, the price of a hotel room, or the price of any other product or service. Product inventory information may include, for example, the number of products available for purchase, available hotel rooms or hotels rooms of a certain tier, restaurant reservation times available for booking, the number of available seats or spots (and times) on an excursion or tour, or any other such information relating to the availability of a product, service, or experience. Related products may include, for example, alternative products or services that may be available, such as rooms in a different hotel or hotel rooms of another tier, dinner reservations at a different restaurant, tours of another location or from another vendor, and the like. The virtual environmental data may include data associated with a merchant having a presence in the physical environment. For example, the merchant may have a presence in the physical environment by offering one or more products or services for sale in the physical environment or by advertising products/services in the physical environment.

Figure 4:
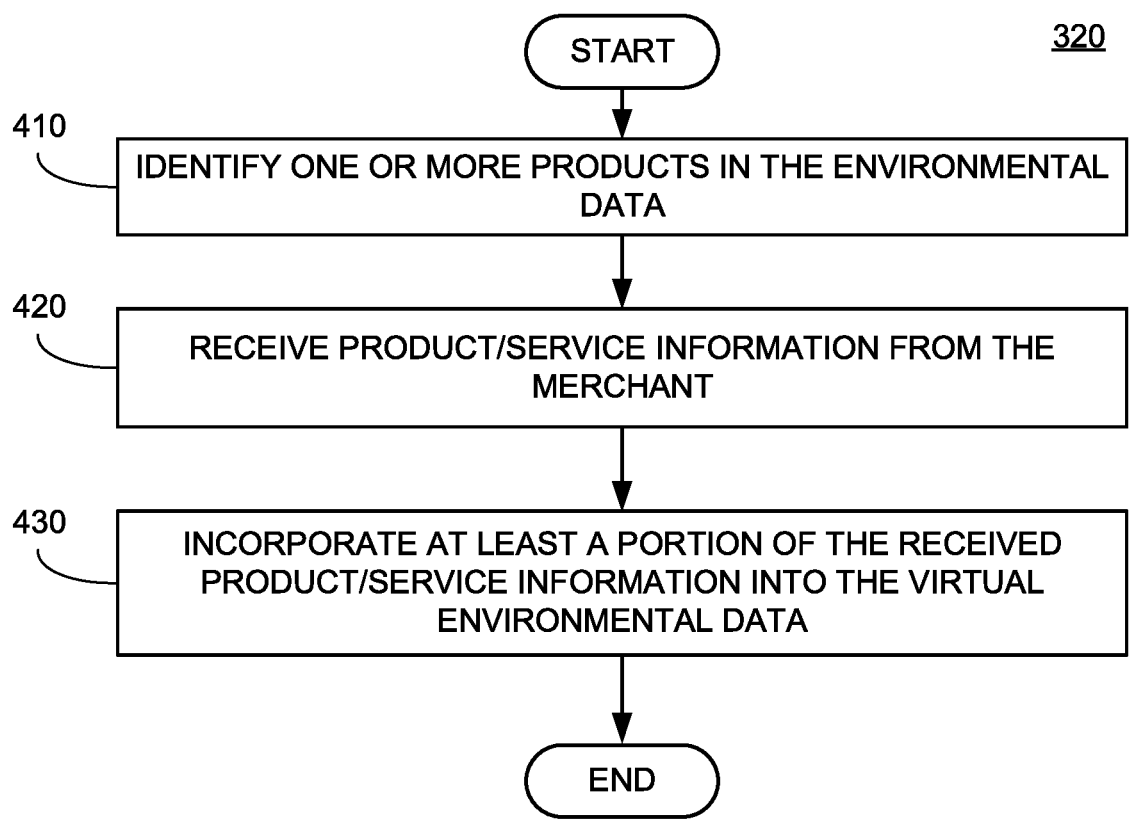
FIG. 4 is a flowchart of an exemplary method for generating virtual environmental data based on environmental data.

As shown in FIG. 4, according to some embodiments, the step 320 of generating virtual environmental data based on the environmental data may include one or more sub-steps. For example, in block 410 the service provider terminal 110 may identify one or more products in the environmental data. For example, service provider terminal 110 may identify one or more products (e.g., hotel room, excursion, massage, etc.) in the audio or visual information by recognizing shapes, bar codes, QR codes, IR beacons or Bluetooth™ beacons (e.g., POS devices 162, 164, 166) located in an environment, or the like. At step 430, service provider terminal 110 may receive product information (such as product/service price, availability, and related products/services as described above) from the merchant, from for example, merchant database terminal 140. The product information may be directed to one or more identified products and services. After receiving product information at step 420, service provider terminal 110 may then incorporate at least a portion of the received product information into the virtual environmental data.

Referring back to FIG. 3, after service provider terminal 110 generates virtual environmental data (at block 320), at step 330 service provider terminal 110 may provide the virtual environmental data to at least a first computing device to create a virtual environment. For example, service provider terminal 110 may provide the virtual environmental data to first computing device 120 and/or to second computing device 130. In some embodiments, the virtual environment data provided to one or more of computing devices 120 and 130 may include some or all of the environmental data received by the service provider terminal 110.

At step 340, service provider terminal 110 may receive, from first computing device 120, user input data associated with one or more predefined user inputs. The user input data associated with one or more predefined user inputs may include a selection of a product displayed in the virtual environment. For example, a user may select a product displayed in the virtual environment in order to purchase or view information about the product. The user input data associated with one or more predefined user inputs may include a selection of a virtual experience associated with a product offered for sale at the physical environment. A virtual experience may include one or more of a virtual tour, a virtual excursion, and a virtual activity. Virtual experiences may correspond to actual experiences in the physical environment. For example, a virtual tour may provide a user with a virtual representation of what the actual tour would look like in real life at the travel destination. A virtual activity may provide a user with the virtual experience of the activity, for example, a user may virtually experience a roller coaster or a scuba dive of a particular location to determine if they are interested in experiencing the real thing (and whether, to them, it is worth the cost and time).

At step 350, service provider terminal 110 may modify the virtual environment on first computing device 120 to display enhanced content based on the user input data. The enhanced content may be content that is unrepresented in the physical environment, such as, for example, product/service information and/or virtual experiences, as described above. In some embodiments, modifying the virtual environment on first computing device 120 includes outputting product/service information for display on first computing device 120. In other embodiments, modifying the virtual environment on first computing device 120 includes outputting the selected virtual experience for display on first computing device 120.

According to some embodiments, the method 300 may further include an additional step whereby the service provider terminal 110 may receive, from the first computing device (e.g., computing device 120), purchase user input associated with one or more predefined purchase user inputs, and transmit a purchase request to purchase the selected product or service offered for sale at the physical environment based on the purchase input.

In some embodiments, the step of providing the virtual environmental data to at least first computing device 120 may further include providing the virtual environmental data to the first computing device 120 and to a second computing device 130 to create a shared visual environment. For example, a shared virtual environment may be a virtual environment that is the same on the first computing device 120 and the second computing device 130 so that users of both devices can share their experience together. Further, in some embodiments, the step 350 of modifying the virtual environment may further include modifying the shared virtual environment on the first 120 and second 130 computing devices to display the enhanced content based on the user input data. For example, if a user selects (e.g., via first computing device 120) a particular virtual excursion, the virtual excursion may be displayed on both the first and second computing devices 120 and 130 simultaneously. Accordingly, system 100 may enable the user of the first computing device 120 and the user of the second computing device 130 to simultaneously explore and interact with the same virtual environment. For example, by utilizing the disclosed system, two friends who are trying to plan a vacation together despite being physically located in different places may nonetheless jointly virtually experience a particular destination or activity together, all before traveling to that destination or before experience an excursion, tour, or other product, so that they may make collective decisions about where to go and what activities to engage in.

In some embodiments, the step 310 of receiving the environmental data may further include receiving the environmental data from second computing device 130, and the second computing device 130 may be located at the physical environment at the travel destination or point of interest. In such embodiments, the step 330 of providing the virtual environment data to at least first computing device 120 may further include providing the virtual environmental data to first computing device 120 to create the virtual environment and to second computing device 130 to create an augmented environment in combination with the physical environment. Further, the step 350 of modifying the virtual environment may further include modifying the virtual environment on the first computing device 120 and the augmented environment on the second computing device 130 to display the enhanced content based on the user input data. Accordingly, in some embodiments, system 100 may enable the user of first computing device 120 to experience a virtual environment that is representative of a physical environment that the user of second computing device 130 is physically present in, while presenting the second user with a corresponding augmented environment via second computing device 130. For example, by utilizing the disclosed system (e.g., system 100), two friends who are trying to plan a vacation together despite being physically located in different places may nonetheless jointly experience a particular destination or activity together, wherein the first friend experiences it virtually and the second friend experiences it via augmented reality, so that they may make collective decisions about where to go and what activities to engage in, thereby adding a social experience to the experience offered by the destination or point of interest.

Figure 5:
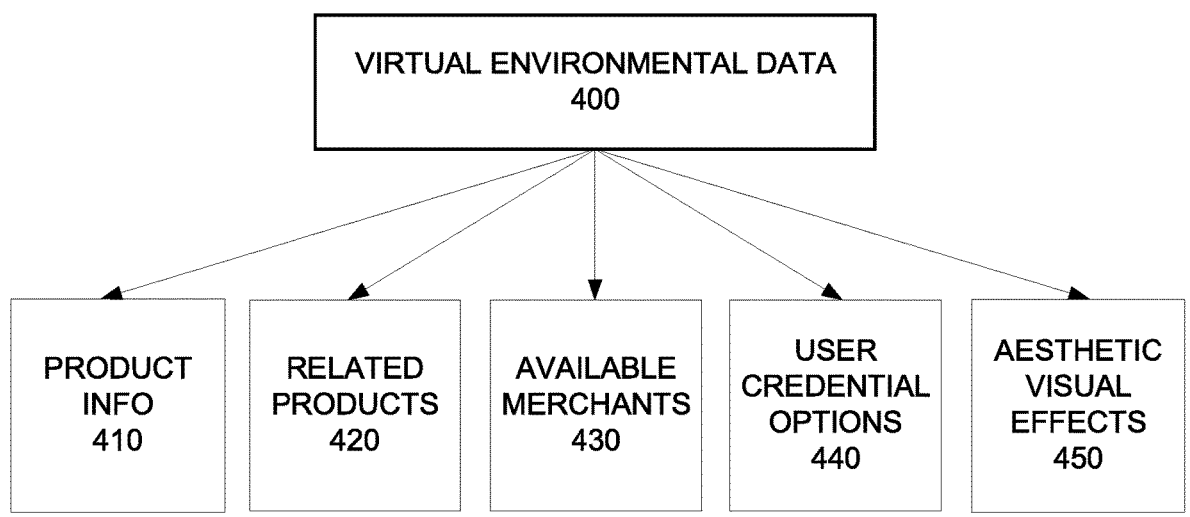
FIG. 5 is a diagram of exemplary types of virtual environmental data.

FIG. 5 shows a diagram that represents an embodiment of exemplary types of virtual environmental data 500. For example, virtual environmental data 500 may include product price information 510, product inventory information 520, related products 530, available discounts 540, or particular visual effects 550. Product price information 510 may include, for example, the price of a product, the price of an excursion or tour, the price of an activity, such as a massage or an amusement park ride, the price of a hotel room, or the price of any other product or service. Product inventory information 520 may include, for example, the number of products available for purchase, available hotel rooms or hotels rooms of a certain tier, restaurant reservation times available for booking, the number of available seats or spots (and times) on an excursion or tour, or any other such information relating to the availability of a product, service, or experience. Related products 530 may include, for example, alternative products that may be available, such as rooms in a different hotel or hotel rooms of another tier, dinner reservations at a different restaurant, tours of another location or from another vendor, and the like.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use case describes one example of a typical user flow pattern. It is intended solely for explanatory purposes and not in limitation. A user in New York may want to plan a vacation to London. The user may use their computing device (e.g., first computing device 120) to view and experience an interactive virtual representation of London (e.g., generated based on data provided by service provider terminal 110) that may allow the user to virtually walk around the city to get a sense of what the attractions look like in real life and/or to virtually experience some of those attractions. For example, the user may experience and explore virtual representations of popular public spaces located in London, such as Piccadilly Circus, Trafalgar Square, Buckingham Palace, etc., or may take a virtual tour of such spaces. Based on these virtual explorations/experiences, the user may gain an appreciation for what a real experience at these locations may consist of, and therefore may be positioned to make more informed decisions about which places the user wants to visit during their limited time stay in London or to enjoy the trip as much as possible while keeping within a trip budget. Further, the system (e.g., system 100) may display (e.g., via first computing device 120) enhanced content as a part of the virtual environment, such as information about products, services, and activities (e.g., received by service provider terminal 110 from merchant database terminal 140). For example, while the user is experiencing virtually walking around London, they may see, for example, a hotel, and be presented with information about the availability and pricing of rooms. Or the user may see a bicycle rental merchant and be presented with the price of renting a bicycle or the times/availability of a bicycle tour of a certain area. The user may also experience various excursions, tours, or other activities or experiences. For example, the user may be curious about what riding the London Eye ferris wheel would be like, and the system (e.g., system 100) may simulate the experience of riding the London Eye in the virtual environment so the user can appreciate what it would be like in real life. Further, the system (e.g., system 100) may also enable a plurality of users to experience a shared virtual environment together simultaneously (e.g., by service provider terminal 110 providing the virtual environment data to first computing device 120 and to second computing device 130). Accordingly, users in different locations may nonetheless virtually experience a destination at the same time together in order to plan a trip together.

Another use case would be for simultaneously providing a virtual environment to a first user (e.g., via a first computing device 120) and an augmented environment to a second user (e.g., via a second computing device 130). For example, the first user may again be interested in planning a trip to London, but in this case, a second user may already be physically present in London. In this scenario, the virtual environment experienced by the first user may be augmented with environmental data obtained by the computing device of the second user, such that the first user's virtual environment may be based on what the second user is seeing and hearing. Furthermore, both users may view enhanced content, such as product/service information and excursion/activity information as described above. For example, the system (e.g., system 100) may determine the location of the second user (e.g., via a geographic location sensor of second computing device 130) and access merchant data (e.g., by via merchant database terminal 150) relating to products and services within 500 feet of the second user. Accordingly, the first and second user can simultaneously view prices of products, services, hotels, restaurants, activities, excursions, and the like that they may be interested in booking together. In this way, the system (e.g., system 100) may facilitate a local user assisting a remote user in planning a trip to the local vicinity.

Other exemplary use cases involve interactions between users each having augmented reality devices as described in the systems and methods herein. Additionally, other exemplary use cases involve interactions between users each having virtual reality devices as described in the systems and methods herein.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

What is claimed is:

1. A system for providing an interactive virtual environment, comprising:
   one or more processors; and
   a memory in communication with the one or more processors and storing instructions that, when executed by the one or more processors, cause the system to:
   receive environmental data comprising visual information representing a physical environment, the environmental data being obtained from at least one environmental data sensor associated with a second computing device;
   generate virtual environmental data based on the environmental data, the virtual environmental data comprising data associated with a merchant having a presence in the physical environment;
   transmit the virtual environmental data to at least a first computing device to allow display of a virtual environment by the first computing device and to the second computing device to allow display of an augmented environment on the second computing device such that users of the first computing device and the second computing device have a shared virtual and augmented environment, respectively;
   receive, from the first computing device, user input that is indicative of selecting a virtual experience associated with an activity or experience offered for sale at the physical environment, the virtual experience comprising a virtual excursion, a virtual activity, or both; and
   modify the virtual environmental data transmitted to the first computing device and the second computing device to include enhanced content based on the user input such that the enhanced content is displayed by the first computing device and the second computing device in the shared virtual and augmented environments, respectively, wherein the enhanced content is unrepresented in the physical environment and modifying the virtual environment data comprises outputting the selected virtual experience for display by the first computing device and the second computing device.

2. The system of claim 1, wherein the virtual environmental data further comprises an available discount associated with the virtual experience for sale.

3. The system of claim 2, wherein the memory stores further instructions that when executed by the one or more processors, cause the system to:
transmit, based on the user input, a purchase request to purchase the virtual experience offered for sale at the available discount and at the physical environment that is associated with the selected virtual experience.

4. The system of claim 1, wherein generating the virtual environmental data comprises:
identifying the virtual experience in the environmental data;
receiving virtual experience information associated with the virtual experience from a merchant database; and
incorporating at least a portion of the virtual experience information into the virtual environmental data.

5. The system of claim 4, wherein the virtual environmental data further comprises one or more of: virtual experience price information, virtual experience inventory information, related virtual experiences, and aesthetic visual effects and wherein the environmental data comprises audio.

6. The system of claim 4, wherein the merchant has the presence in the physical environment by offering one or more virtual experiences for sale in the physical environment, and the received environmental data comprises virtual experience information associated with the one or more virtual experiences offered for sale in the physical environment.

7. The system of claim 4, wherein identifying the virtual experience in the environmental data further comprises recognizing shapes, bar codes, quick response (QR) codes, or infrared (IR) beacons, or short-range wireless beacons associated with the virtual experience.

8. A method for providing an interactive virtual environment, comprising:
receiving, environmental data comprising visual information representing a physical environment, the environmental data being obtained from at least one environmental data sensor associated with a second computing device;
generating virtual environmental data based on the environmental data, the virtual environmental data comprising data associated with a merchant having a presence in the physical environment;
transmitting the virtual environmental data to at least a first computing device to allow for display of a virtual environment by the first computing device and to the second computing device to allow display of an augmented environment by the second computing device such that users of the first computing device and the second computing device have a shared virtual and augmented environment, respectively;
receiving, from the first computing device or the second computing device, user input that is indicative of selecting a virtual experience associated with an activity or experience offered for sale at the physical environment, the virtual experience comprising a virtual excursion, a virtual activity, or both; and
modifying the virtual environmental data transmitted to the first computing device and the second computing device to include enhanced content based on the user input such that the enhanced content is displayed by the first computing device and the second computing device in the shared virtual and augmented environments, respectively, wherein the enhanced content is unrepresented in the physical environment and modifying the virtual environment comprises outputting the selected virtual experience for display on the first computing device and the second computing device.

9. The method of claim 8, wherein the virtual environmental data further comprises an available discount associated with the virtual experience for sale.

10. The method of claim 9, further comprising transmitting a purchase request to purchase the virtual experience at the available discount and offered for sale at the physical environment that is associated with the selected virtual experience based on the user input.

11. The method of claim 8, wherein generating the virtual environmental data comprises:
identifying the virtual experience in the environmental data;
receiving virtual experience information associated with a product from a merchant database; and
incorporating at least a portion of the virtual experience information into the virtual environmental data.

12. The method of claim 11, wherein the virtual environmental data further comprises at least one element of virtual experience price information, virtual experience inventory information, related virtual experiences, and aesthetic visual effects and wherein the environmental data comprises audio.

13. The method of claim 11, wherein the merchant has the presence in the physical environment by offering one or more virtual experiences in the physical environment, and the received environmental data comprises virtual experience information associated with the one or more virtual experiences offered for sale in the physical environment.

14. The method of claim 11, wherein identifying the virtual experience in the environmental data further comprises recognizing shapes, bar codes, quick response (QR) codes, infrared (IR) beacons, or short-range wireless beacons associated with the virtual experience.

15. A system for providing an interactive virtual environment, comprising:
one or more processors; and
a memory in communication with the one or more processors and storing instructions that, when executed by the one or more processors, cause the system to:
receive environmental data comprising visual information representing a physical environment, the environmental data being obtained from at least one environmental data sensor associated with a first computing device;
generate virtual environmental data based on the environmental data, the virtual environmental data comprising data associated with a merchant having a presence in the physical environment;
transmit the virtual environmental data to the first computing device to allow display of an augmented environment by the first computing device and to a second computing device to allow display of a virtual environment on the second computing device such that users of the first computing device and the second computing device have a shared augmented and virtual environment, respectively;
receive, from the first computing device, user input data associated with one or more predefined user inputs, the user input data comprising a selection of a virtual experience displayed in the virtual environment and associated with an activity or experience offered for sale at the physical environment, the virtual experience comprising a virtual excursion, a virtual activity, or both; and
modify the virtual environmental data transmitted to the first computing device and the second computing device to include enhanced content based on the user input data such that the enhanced content is displayed by the first computing device and the second computing device in the shared augmented and virtual environments, respectively, wherein the enhanced content is unrepresented in the physical environment and modifying the virtual environment data comprises outputting the selected virtual experience for display by the first computing device and the second computing device.

16. The system of claim 15, wherein the user input data further comprises selecting the virtual experience with an available discount.

17. The system of claim 16, wherein the memory stores further instructions that when executed by the one or more processors, cause the system to:
transmit a purchase request to purchase the virtual experience at the available discount that is associated with the selected virtual experience based on the user input data.

18. The system of claim 15, wherein generating the virtual environmental data comprises:
identifying the virtual experience in the environmental data;
receiving virtual experience information associated with the virtual experience from a merchant database; and
incorporating at least a portion of the virtual experience information into the virtual environmental data.

19. The system of claim 15, wherein the virtual environmental data further comprises at least one element of virtual experience price information, virtual experience inventory information, related virtual experiences, and aesthetic visual effects.

20. The system of claim 19, wherein the virtual environmental data comprises the virtual experience price information comprising at least one price of a price of the virtual experience and where in the environmental data comprises audio.

* * * * *